United States Patent [19]

Tyrrell

[11] Patent Number: 4,852,157
[45] Date of Patent: Jul. 25, 1989

[54] MULTI-TASK STATE MACHINE SIGNALLING TRANSLATOR

[75] Inventor: Raymond E. Tyrrell, Zebulon, N.C.

[73] Assignee: Alcatel NA, Inc., Claremont, N.C.

[21] Appl. No.: 163,765

[22] Filed: Mar. 3, 1988

[51] Int. Cl.$^4$ .............................................. H04M 7/12
[52] U.S. Cl. .................................. 379/236; 379/229; 370/110.1
[58] Field of Search ............... 379/234, 229, 231, 232, 379/233, 236, 237, 240; 370/110.1, 110.2, 79, 84, 58, 66

[56] References Cited

U.S. PATENT DOCUMENTS

4,623,760 11/1986 Binkerd et al. .................. 379/377 X
4,636,584 1/1987 Binkerd et al. ...................... 379/240

*Primary Examiner*—James L. Dwyer
*Attorney, Agent, or Firm*—Peter C. Van Der Sluys

[57] ABSTRACT

Real-time conversion between two different A/B signal coding schemes based on the DS1 time division multiplex format is achieved by time sharing a programmable state machine. The time sharing is accomplished synchronously with the DS1 superframe such that each of the 24 DS1 channels have signalling translated once every superframe. Programmability of the state machine is facilitated by the use of an EPROM. A RAM is used for real-time storage of signal states, machine states and processor provisioning for each channel; thereby facilitating time sharing of the state machines. Flexibility is provided through the unique use of an EPROM, which can be modified to directly change the signalling translation response depending on the type of telephony service being provided and the coding scheme used for the signalling. Processor provisioning of the RAM selects a service type translation for each of the 24 DS1 channels.

20 Claims, 4 Drawing Sheets

| BIT | CHANNEL N | | | | | | | | CHANNEL N + 1 | | | | | | | | CHANNEL N + 2 | | | | | | | | CHANNEL N + 3 | | | | | | | |
|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| TRANS-ACTION | 1 | 2 | OUT SS | OUT TS | | | | | 6 | | OUT SS | OUT TS | | | 7 | | 8 | | OUT SS | OUT TS | | 9 | F B | F B | 10 | | OUT SS | OUT TS | | | |
| BUS ACTION | R E | R T | R R | R R | R R | R R | R R | R T | R R | R R | R R | R T | 'WR' | 'WR' | R R | R R | R R | R T | 'WR' | 'WR' | R R | 'WR' | F B | F B | 'WR' | R R | R R | R T | | | |

BUS ACTION — RR — RAM READ
T — TRISTATE/BUS DIRECTION CHANGE
RRE — INTERFACE READ
WR — RAM WRITE
FB — FRAME BIT

FIG.5

MULTI-TASK STATE MACHINE SIGNALLING TRANSLATOR

BACKGROUND OF THE INVENTION

1. Field of the Invention

The present invention relates to digital communications systems, and more particularly, to the processing of signalling information that is passed between facilities of a telecommunications system. The invention provides a multi-task signalling translator for translating signalling information between system components having incompatible signal coding schemes.

2. Description of the Prior Art

Digital switch interfaces or digital channel banks are generally used as voice terminals for a digital transmission network. These devices typically interface a conventional central office switch and a digital transmission facility. They sample the speech amplitude and the signalling state of each of a plurality of trunks or voice channels in rotation. The sampled information is multiplexed on a time division basis and is transmitted directly to a digital line, or by one or more stages of digital multiplexing, to a higher speed digital line. At the receiving end, which may be another central office switch or a digital remote terminal, another digital interface or channel bank restores the original transmission amplitudes and signalling states.

Thus, the role of the digital channel banks and digital interfaces is to reproduce the voice and signalling information so that from the point of view of the central office and or remote terminal, they appear to be interconnected by metallic wire.

Signalling continuity is maintained by detecting the incoming signalling state of each trunk at each channel unit of a digital channel bank or digital switch interface and periodically a digital line bit carries this detected information to the receive terminal or channel bank and then to the receive channel unit.

Figure 1:
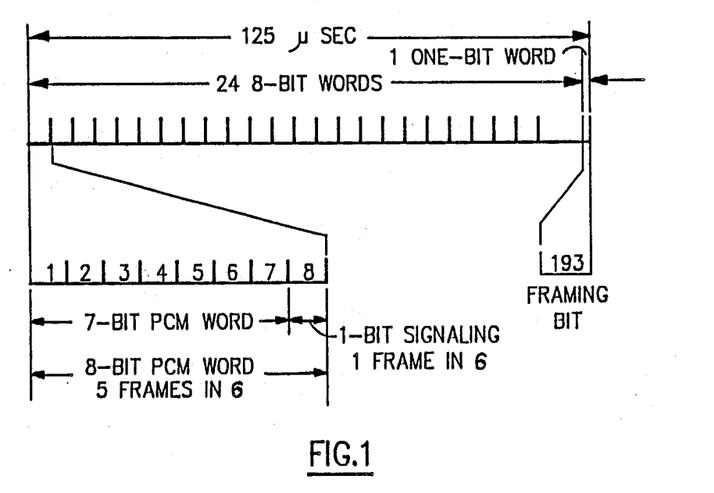
FIG. 1 is a graphical representation of a single frame of a standard DS1 digital signal as used in the present invention.

In North America, most telephony transmission is pulse code modulated based on the DS1, 24 channel time division multiplex scheme or very similar 24 channel time division formats. Each of the channel periods contain 8 PCM coded bits resulting in 192 bits for 24 channels. An additional bit called the frame bit is added to distinguish the beginning and end of the repeated 24 channel format. The 193 bits are referred to as a frame and are transmitted at a 1.544 Mbps rate. FIG. 1 shows the DS1 format.

Signalling for functions such as ringing and call origination or detection has been accomplished by coding two signal bits, A and B, which are inserted into each of the 24 channels once every twelve frames. The frame bit is coded to identify a repeating group of 12 frames referred to as a superframe. In frame 6, the least significant bit of each 8-bit PCM channel word is replaced with the state of the channel's A signal bit. In frame 12, the least significant bit in each channel is replaced with the channel's B signal bit.

In modern telephony, many different types of services are offered. The most common is POTS, plain old telephone service. Other common services are: 4 WEM (4-wire E&M signalling), COIN, 2-party divided, bridge frequency selective and ground start. All of these services use the A/B signalling in PCM transmission. In providing these services, equipment manufacturers have implemented different coding schemes for the A/B signal bits, which have evolved over the years.

A good example of this is illustrated by products based on the TR-TSY-000008 Digital Interface Specification (TR8) for digital interfaces between a SLC 96 Digital Loop Carrier System using the DS1 format and a local digital switch. Other products are based on the PUB 43801 (D4) specification for digital channel banks associated with a DS1 formatted digital loop carrier.

The TR-TSY-000008 (TR8) is a recent specification from Bell Communications Research and sets forth the interface requirements for direct connection of a digital loop carrier to a central office switch. The interface requirements were specifically based on AT&T/Western Electric's SLC 96 Digital Loop Carrier and the No.5 ESS Central Office Switch. With the publication of these interface requirements, other manufacturers of existing central office switches and digital loop carrier products can design their products to be compatible with this common interface specification.

To make existing equipment compatible with the interface requirements, the coding scheme for the A/B signal bits of the existing equipment must be translated in a real-time fashion to the coding scheme used by the interface specification. This signalling translation function will be a requirement for all future interface standards.

Given the multitude of signalling schemes and types of telephone service available, small changes or differences in signalling schemes for telephone services, between equipment manufacturers, can create expensive and time consuming hardware changes if translators are not programmable. Thus, there exists a need for a signalling translator that is programmable and that can accommodate the various types of telephone service presently offered and that may be offered in the future.

SUMMARY OF THE INVENTION

The present invention contemplates a multi-task state machine signalling translator that is programmable and allows for real-time conversion between two different coding schemes for the A/B signalling, both of which are based on the DS1 time division multiplex format.

The invention accomplishes this function by time sharing a programmable state machine. The time sharing is accomplished synchronously with the DS1 superframe, or an enhanced superframe, such that each of the 24 channels of the DS1 format have signalling translated once every superframe. Programmability is facilitated by the use of an EPROM or RAM in the state machine to determine the next machine state in the translation process. To accomplish the time sharing, RAM is used for real-time storage of signal states, machine states and processor provisioning. Changes in the state machine EPROM or RAM directly change the signalling translation response for a type of telephone service. Processor provisioning of the storage RAM selects a telephone service type for the translation to be performed for each of the 24 DS1 channels.

A primary objective of the present invention is to provide a signal translator for translating the signalling of two equipments that utilize different coding schemes.

Another objective of the present invention is to provide a signalling translator that is programmable.

Another objective of the present invention is to provide a signalling translator which is adaptable to handle multiple tasks thereby facilitating its use with several types of telephone service.

DETAILED DESCRIPTION OF THE PREFERRED EMBODIMENT

The multi-task state machine signalling translator of the present invention will be described as embodied in a digital interface subsystem, as for example, that used in the Alcatel 1218 Digital Remote Terminal. However, the signalling translator of the present invention is adaptable to any digital interface used with a digital loop carrier based on the DS1 format.

Figure 2:
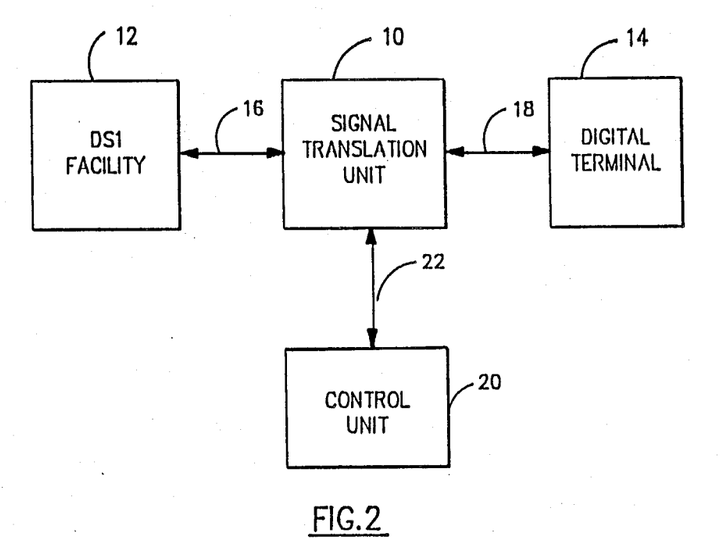
FIG. 2 is a block diagram illustrating an environment in which the present invention is contemplated for use.

Referring to FIG. 2, there is shown a block diagram illustrating an environment in which the present invention may be used. A signal translation unit 10 is disposed between a DS1 based facility 12 and a digital terminal 14. The DS1 facility 12 is connected to the signal translation unit 10 by a digital loop carrier 16, such as a SLC 96 Digital Loop Carrier utilizing the DS1 PCM format. The DS1 facility 12 could be manufactured in accordance with the TR-TSY 000008 requirements for connection to a digital switch when switched services are being provided. Alternatively, for the provision of unswitched services, the DS1 facility 12 could be manufactured in accordance with the specifications of PUB 43801 in the form of a D4 type channel bank.

The digital terminal 14 could be an Alcatel 1218 Digital Remote Terminal. A connection 18 between signal translation unit 10 and the digital terminal 14 will provide a serial signal in both directions for signalling, a serial signal in both directions for data, a 1.544 MHZ clock and a frame timing signal for the serial data streams.

For purposes of this description, the translation unit 10 will be considered to be associated with the digital terminal 14 which will be called the "local system". The DS1 facility 12 will be called the "remote system". Of course, it should be understood that the translation unit can be located at either end of the carrier while still practicing the spirit of the invention.

A control unit 20 is connected to the signal translation unit 10 by way of a microprocessor control bus 22. The control unit 20 may be part of the common equipment of the digital terminal 14. The control unit 20 provides all administrative and maintenance control functions for the signal translation unit 10. The control functions will involve such things as configuring the signal translation unit for the type of telephone service to be provided by a line circuit. This configuration is provided on a per channel basis. The other control functions include recognition and system notification of MLT test requests, detection of red or yellow span alarm conditions followed by trunk conditioning and diagnostic fault detection. The control unit 20 includes a controlling microprocessor.

In a complete digital interface subsystem, it is contemplated that multiple signal translation units will be utilized for connection to a number of DSI formatted digital loop carriers, all of which will be under the control of a single control unit 20. For reliability purposes, a redundant control unit may be provided for backup.

Each signal translation unit 10 converts the signals from the DS1 facility to the required timing and format necessary to interface with the digital terminal. When used with the Alcatel 1218 Digital Remote Terminal, this involves converting the received data from the DS1 facility into two 1.544 MHZ D4 formatted serial bit streams, one for signalling and one for VF data. These signals are made to conform to the requirements of the digital terminal. In the opposite direction, this involves converting two 1.544 MHZ D4 formatted serial bit streams, one for signalling and one for VF data, into one DSI formatted signal to meet the TR8 or D4 requirements. Integrated into this bidirectional signalling conversion is the signalling translation process to which the present invention is directed.

As previously mentioned, many different types of telephone service are provided by telephone systems. Each of these types of service require a number of different signalling states. These signalling states must be provided using only the A and B signal bits, each of which may have only a "1" or a "0" state. It is clear that only a limited number of signalling states may be accommodated by these two bits. Accordingly, other signalling schemes were established wherein the A and B bits of sequential superframes were combined to provide more signalling states. In one scheme that has been widely adopted, the A and/or B bits may be in a condition which is alternating between "1" and "0" states, this is called a "toggling state". Thus, the states of the A and B bits may be either "1", "0" or "toggling". This new scheme still provides only a limited number of combinations for signalling purposes. Thus, for each different telephone service type, a different signalling scheme using the A and B bits must be used. These schemes vary from equipment manufacturer to equipment manufacturer.

Examples of a limited number of translations required for two different types of service, on two different types of equipment, are shown in Tables I and II. In Table I, the states of the A and B bits in a TR8 system are compared with the states of the A and B bits in the Alcatel 1218 Remote Digital Terminal for the various signalling states used for the two-party divided type of service. As can be seen, ON-HOOK would require translation, while IDLE would not require translation. In a similar manner, translation would be required for the other signalling states. For the signalling state of −T RING the state of the A bit is "toggling" and the state of the B bit is "1".

In Table II there are shown the states of the A and B bits for a D4 system compared with the Alcatel 1218 Digital Remote Terminal for the 4-wire E&M signalling. The translations shown in Tables I and II are extremely simple examples of the signalling translations that are required for each different type of service provided.

TABLE I

| TWO PARTY DIVIDED | | | | |
|---|---|---|---|---|
| TR8 | | | 1218 | |
| A | B | | A | B |
| 0 | 0 | ON HOOK | 1 | 1 |
| 1 | 1 | IDLE | 1 | 1 |
| 1 | 0 | OFF HOOK | 0 | 1 |

TABLE I-continued

| TWO PARTY DIVIDED | | | | |
|---|---|---|---|---|
| TR8 | | | 1218 | |
| A | B | | A | B |
| 0 | 1 | TIP PTY GND | 0 | 0 |
| 1/0 | 1 | −T RING | 1 | 0 |

TABLE II

| 4 WEM | | | | |
|---|---|---|---|---|
| D4 | | | 1218 | |
| A | B | | A | B |
| 0 | 0 | E OPEN | 0 | 1 |
| 0 | X | M GRD/OPEN | 1 | X |
| 1 | X | E GND | 1 | 1 |
| 1 | 1 | M BATTERY | 0 | X |

Figure 3:
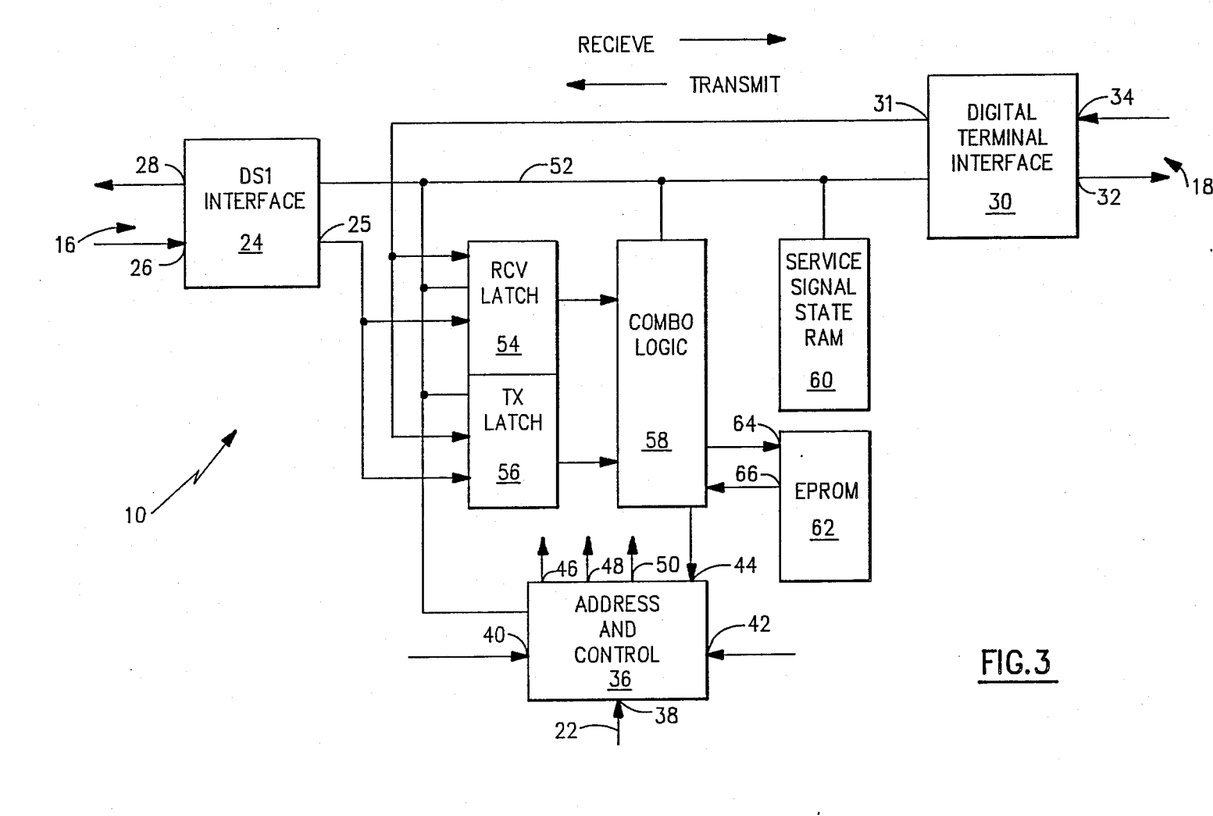
FIG. 3 is a block diagram of the present invention.

The signal translation unit 10 is shown in greater detail in FIG. 3. Referring to FIG. 3, there is shown the digital loop carrier 16 connected to a DSI interface 24. The DS1 interface 24 includes an input 26 for receiving the A/B signalling bits and an output 28 for transmitting the A/B signalling bits to the DS1 facility.

The connection 18 is connected to a digital terminal interface 30, which includes an output 32 for providing the A/B signal bits to the digital terminal 14 and has an input 34 for receiving A/B signal bits from the digital terminal.

In this description, the receive direction is considered to be from the remote system to the local system while the transmit direction is from the local to the remote system as shown by the arrows in FIG. 3.

An address and control unit 36 is connected to the microprocessor control bus 22 at an input 38. The address and control unit 36 also includes inputs 40 and 42 for receiving timing information from the remote system and local system respectively. The remote system timing is derived from the DS1 signal on the digital loop carrier 16 and the local system timing is derived from the signals on connection 18 provided by the digital terminal. The address and control unit 36 also includes an input 44 for receiving an interrupt signal. The address and control unit 36 has three outputs, 46, 48 and 50, for providing address, selection and timing signals respectively.

A bidirectional data bus 52 interconnects a number of components of the signal translation unit such as a receive latch 54, a transmit latch 56, a combinational logic 58, a service signal state RAM 60, the digital terminal interface 30, the DS1 interface 24 and the address and control unit 36. The bidirectional data bus 52 provides the A and B signal bits to the digital terminal interface 30 for transmission to the digital terminal 14 on connection 18 in the receive direction and provides the A and B signal bits to the DSI interface 24 to be transmitted in the transmit direction on the digital loop carrier 16 to the DS1 facility.

The DS1 interface 24 has an output 25 connected to the receive latch 54 and the transmit latch 56 for providing A/B signal bits to the latches from the digital loop carrier 16. In like manner, the digital terminal interface 30 has an output 31 connected to the receive latch 54 and the transmit latch 56 for providing A/B signal bits from the digital terminal.

Both the receive latch 54 and the transmit latch 56 have outputs connected to the combinational logic 58. The combinational logic 58 has an output connected to the address and control unit 36 for providing an interrupt signal to input 44 thereof.

An EPROM 62 has an input 64 for receiving address information from the combinational logic 58 and an output 66 for providing data to the combinational logic 58.

The address and control unit 36 provides all of the required timing and selection signals to the components connected to the bidirectional bus 52 to provide proper access to said bus. This function of the address and control unit 36 is facilitated by its receiving timing signals at inputs 40- and 42. Unit 36 also provides address information from output 46 to the DS1 interface 24 and the service signal state RAM 60.

The address and control unit 36 is connected to the microprocessor control bus 22 and the bidirectional bus 52 so that the microprocessor contained in control unit 20 has read/write access to the service signal state RAM 60. The RAM read/write function is performed by control of the processor's wait line. When the processor attempts to read or write to the service signal state RAM 60, the address and control unit 36 holds the processor in a wait state until the bidirectional bus 52 is available for the operation.

With this ability, the processor can provide a code indicative of a channel's required telephone service type to be used by the combinational logic 58 to select the required signalling translation circuit for the particular type of service being provided on a channel. Unit 36 also provides a buffer for the microprocessor.

The DS1 interface 24 provides the required facilities for receiving A/B signal bits in the DSl format at input 26 and for transmitting A/B signal bits at output 28 in the DS1 format.

The interface provides transformer coupling and electrical conversion between the DSI bipolar PCM format and the unipolar TTL levels required by the signal translation unit. A primary function of this interface is to detect and store all of the received A/B signal bits for all 24 channels at least once every 12 frames. In a superframe, consisting of 12 frames, the sixth frame would contain the A signal bits for each of the 24 channels and the twelfth frame would contain the B signal bits for each of the 24 channels. The DSI interface is also adapted to provide additional storage when an extended superframe of 24 or more frames is used to facilitate additional signalling states represented by the A and/or B bits.

This storage function is provided by the DS1 interface because the decode process may require the storage of prior signal bit states. As an example, immediate access to such prior bit states is required for the purpose of recognizing a toggle state. By providing this storage, the translation process can be synchronized to the signalling received from the local system thereby minimizing the need for storage of signal bits from the local system in the digital terminal interface 30.

In the case of the signal translation unit being connected between a DS1 facility of the TR8 type and an Alcatel 1218 Digital Remote Terminal, the DSI interface 24 stores three samples of both the A and B signal bits for each received channel. By examining these three samples of the A and B signal bits, it can be determined if the signal bit is at a "0", "1" or "toggling" state. The resulting signal bit states are stored for each channel and are provided to the receive latch 54 and the transmit latch 56 based upon the address and selection signals provided by the address and control unit 36.

The above describes the receive function of the DS1 interface 24; however, said interface also has a transmit function. The DS1 interface 24 based on address and control signals received from the address and control unit 36 accepts A/B signal bits from the service signal state RAM 60 on the bidirectional data bus 52 for all 24 channels during each transmit frame. During a transmit channel period, the A/B signal bit for the next transmit channel is read in from the RAM 60 and latched. During the next transmit channel period, the latched A/B signal bit is inserted into bit 8 of the PCM word for the channel and is transmitted.

The digital terminal interface 30 functions to provide A and B signal bits to the digital terminal via connection 18. The interface 30 functions as a buffer for the digital terminal. The interface is adapted to handle a serial signal in both directions. The interface also is adapted to receive clock and frame timing signals from the digital terminal and to provide such signals to input 42 of the address and control unit 36.

The digital terminal interface 30 receives and detects A/B signal bits from the Alcatel 1218 Digital Remote Terminal for each of the 24 channels every 12 frames. The signal bits are provided to the receive latch 54 and the transmit latch 56 based on the address and selection provided by the address and control unit 36. No memory storage of the signal bits is required because the translation process is synchronized to the availability of signal bits from the local system at the digital terminal interface 30.

Based on frame timing provided by the address and control unit, the digital terminal interface 30 accepts signal bits from the service signal state RAM 60 for all 24 channels during each system frame. During one channel period, the signal bit for the next active channel to be provided to the digital terminal 14 is read in from the RAM and latched. During the next channel period, the latched signal bit is provided as an output when required. When an Alcatel 1218 Digital Remote Terminal is utilized, the signal bits are output during every frame.

In the translation process, an address for EPROM 62 will be developed from combinational logic 58 which receives inputs from two multibit latches, one latch 56 for the signalling in the transmit direction and one latch 54 for signalling in the receive direction.

The receive latch 54 and transmit latch 56 each function to receive inputs from the service signal state RAM 60, the DS1 interface 24 and the digital terminal interface 30. The inputs from the RAM consist of prior translated channel A/B signalling states, channel service type codes, and prior translation machine states. The DS1 interface 24 provides inputs representing the present channel A/B signal bits from the DS1 digital loop carrier and the digital terminal interface 30 inputs represent the present channel A/B signal bits from the digital terminal.

The combinational logic 58 includes a number of combinational logic circuits each associated with one or more of the telephone service types. It receives inputs from the receive latch 54 and transmit latch 56 and also from the EPROM 62 based on the address provided to the EPROM. It outputs data to the service signal state RAM 60 and an interrupt signal to the address and control unit 36.

Inputs to the combinational logic 58, from the receive latch 54 and transmit latch 56, select a particular combinational logic circuit depending on the telephone service type code, for the channel being translated. The selected combinational logic circuit decodes the remaining latch inputs to generate an EPROM address. Control data from the EPROM at the selected address is provided to the combinational logic 58 and is added to the decoded signals to provide the translated A/B signal bits, several prior machine states and a possible processor interrupt. The resulting A/B signal bits and prior machine states are sent to the service signal state RAM 60 for storage and use in the next translation process for the associated channel. As stated earlier, the resulting A/B signal bits are read from service signal state RAM 60 and provided to the DS1 interface 24 and digital terminal interface 30 at the appropriate times. If an interrupt is generated, it is sent to the address and control unit and a flag is stored in the RAM 60.

The EPROM 62 uniquely provides the programmability of the translation process. It is memory mapped based on the telephone service types to be translated. Based on outputs from the combinational logic 58 used to address the EPROM 62; the EPROM outputs data which determines the translated A/B signal bits for the channel and the next machine state in the translation process.

The service signal state RAM 60 stores the translated A/B signal bits for the channels, channel service type codes, and prior machine states. The RAM contains stored data for the 24 channels being transmitted on the DS1 digital loop carrier and for the 24 channels received from the DS1 digital loop carrier. By storing the prior machine states and channel service type codes, the RAM uniquely allows for time sharing of the translation state machine by all channels.

The translation state machine is comprised of the receive and transmit latches, the combinational logic and the EPROM. When the remote system is based on the TR8 specification, a new translation process occurs every twelve frames for each of the 24 channels. Since the translation state machine receives prior machine states and service type codes from the RAM for each channel translation transaction, it can be used to provide the translations for all channels.

The RAM 60 provides a degree of programmability in that each channel can be programmed for translation via a particular telephone service type code. The service code dictates the combinational logic circuit selection and the high order address of the EPROM used in the state machine translation. A portion of the service code or additional control bits written into the RAM by the processor can be used in the selected combinational logic circuit to modify the decode function.

As previously mentioned, a state machine is provided by the components, including the receive and transmit latches 54 and 56, the combinational logic 58 and the EPROM 62. The RAM 60 may also be considered part of the state machine. A memory section of the EPROM is assigned to each line circuit service type that is required for the particular terminal being serviced. The size of the memory section is dictated by the signal translation process which requires the most states. As an example, to translate BFS ringing for a frequency of 20 Hz, it is anticipated that 100 memory locations of the EPROM will be required for 100 states. When this memory is added to the number of memory locations required to produce all the other frequencies plus the memory locations required to handle "OFF-HOOK" and "ON-HOOK" states, then the EPROM memory section size can be determined.

From the RAM 60, the telephone service type codes indicate what service type is being translated and are used in the combinational logic for the first level of addressing to the EPROM. From the RAM, the A/B signal bits and possibly control bits are inputs to the combinational logic and represent the resulting signalling state from the previous translation process.

Assuming the use of the Alcatel 1218 Digital Remote Terminal, the inputs to the digital terminal interface 30 will be A, B, and TSB2 signal bits and a control bit in the form of an interrupt flag bit to indicate a TR8 MLT test request. The TSB2 signal bit provides additional signal states used in the Alcatel 1218 Digital Remote Terminal. At the output of the DS1 interface, the signalling will include the A/B signal bits having "1", "0" or "toggling" states. Both the service type and signal bit inputs are written and read from RAM via the microprocessor interface contained in the addresses and control unit.

The RAM 60 also provides up to eight prior machine states resulting from the previous translation process. In the receive direction, these eight machine states are latched in the receive latch 54 along with the inputs from the DS1 interface, the service code inputs from the RAM and the previously translated A/B signal and control bits from RAM. These latched inputs and up to two A/B signal bits from the transmit direction, for reverse direction requirements, are presented to the combinational logic 58 to produce the EPROM address. In the translation process, it is often necessary to know what the signalling is in the reverse direction. The EPROM data readout is brought back into the combinational logic for possible further decoding. Due to the different types of services provided on the 24 channels, many variations of decoding may be required. The EPROM provides the flexibility to program in these decoding variations and the possibility to change the decoding as needs change.

The final output results are written to the service signal state RAM 60 as the current translated receive A/B signal bits and as the prior machine states for use during the next receive translation process associated with this channel.

During the receive translation, this same translation process simultaneously takes place for the same channel in the transmit direction. In the transmit direction, the latch inputs include: A/B signalling from the digital terminal interface, the service code inputs from RAM, the previously translated A/B signal bits from RAM, prior machine states from RAM and receive A/B signal bits from the DSI interface 24. The final output results are written to the service signal state RAM 60 as the current translated transmit A/B signal bits and as the prior machine states for use during the next transmit translation process associated with this channel.

Integrated in the translation process is the requirement to output the current translated signalling for both directions. Once during each DS1 channel period the translated receive A/B signal and control bits from the service signal state RAM 60, are provided to the digital terminal interface 30 for transfer to the digital terminal during the next channel period. Also, once during each DS1 channel period, the translated transmit A/B signal bits from the service signal state RAM 60 are provided to the DS1 interface 24. These translated A/B signal bits are transmitted over the digital loop carrier during the appropriate channel periods in frames 6 and 12.

It was mentioned in the receive translation process description that one of the bits provided to the interface 30 could be a control bit in the form of an interrupt flag which indicated a TR8 MLT test was being requested for the line circuit attached to the translated receive channel. During a translation process which sets the interrupt flag, the combinational logic 58 will send an interrupt signal to the processor interface in the address and control unit 36.

Figure 4:
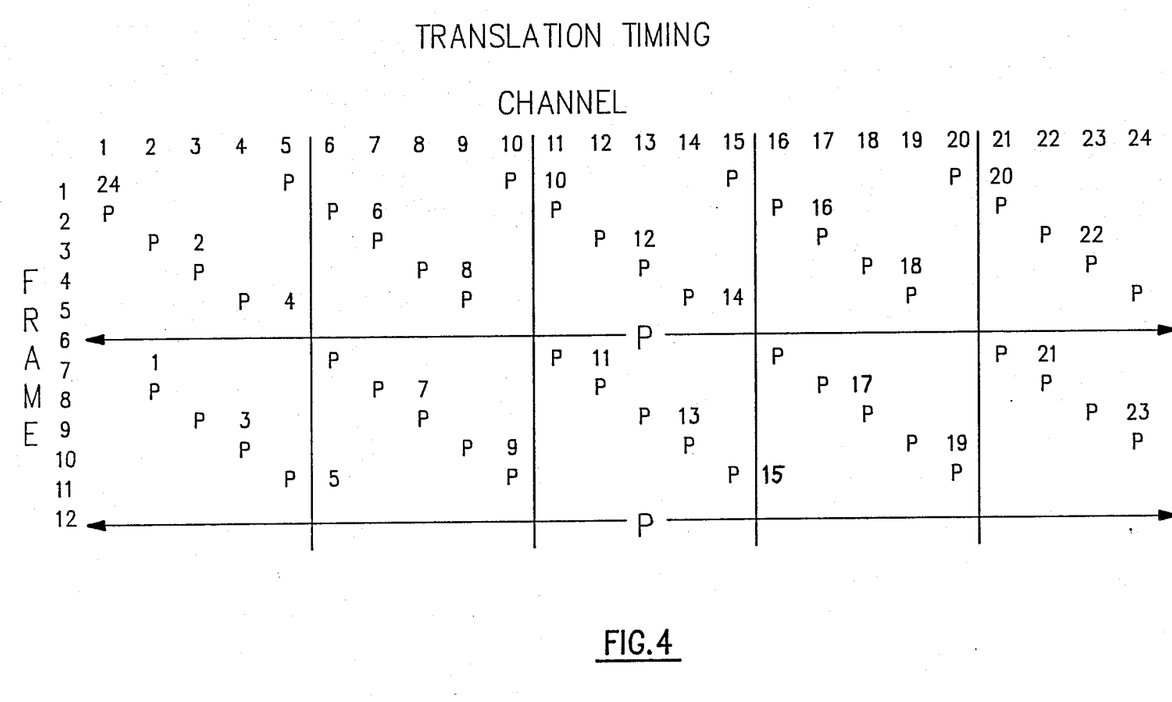
FIG. 4 is a graphical representation of a possible translation timing.
Figure 5:
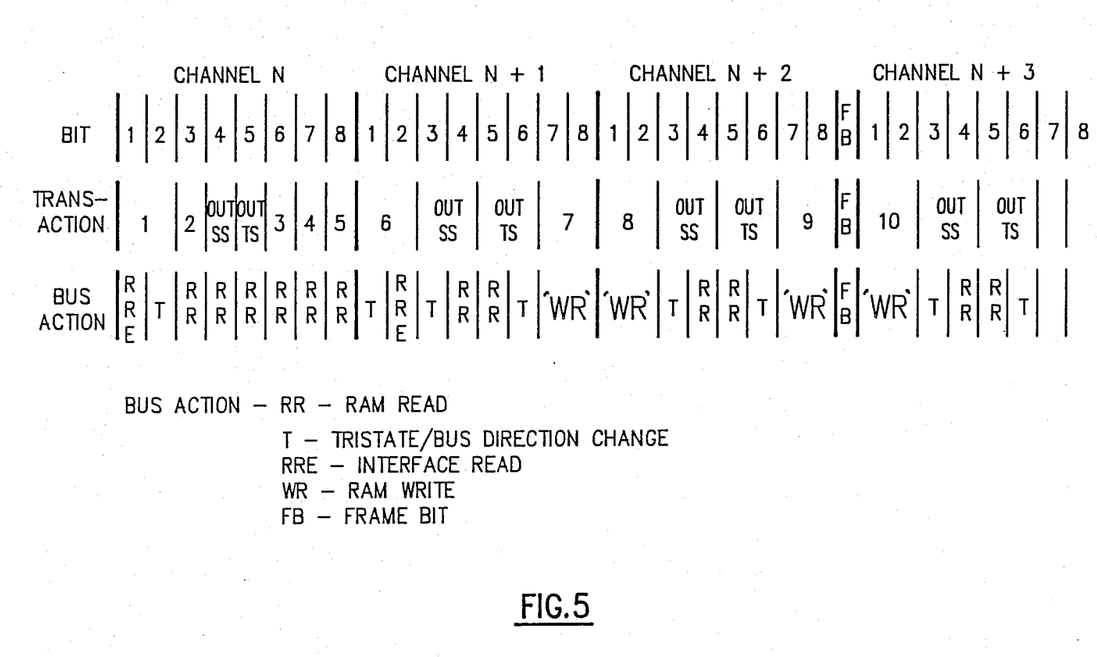
FIG. 5 is a graphical illustration of the possible timing of translation transactions.

Referring to FIGS. 4 and 5, there is represented the possible translation timing for updating each received and transmitted channel. The frame timing shown in FIG. 4 is referenced to the digital terminal interface inputs or local system timing. Signal translation in both the receive and transmit directions for channel 24 starts at the beginning of frame 1, channel 1, as indicated by the number 24 placed in that time slot, and proceeds for four channel periods to the beginning of frame 1, channel 5. This allows the channel 24, signalling to shift in from the digital terminal interface 30 during frame 12, channel 24, and be sent to the transmit latch 56 while simultaneously channel 24, A/B signal bits from the DS1 interface are sent to receive latch 54.

Signal translation for channel 2 starts at the beginning of frame 3, channel 3, and stops at the beginning of frame 3, channel 7. Note that in every five channel periods, in all frames except 6 and 12, a "P" is indicated and for frames 6 and 12 a "P" is indicated in all channels. The presence of a "P" means that the channel period is made available to the processor interface for read/write operations to the service signal state RAM 60. If the processor interface controls a processor "wait" line, the processor could be held in a wait state for a maximum of five channel periods, or approximately 26 microseconds.

Note that in FIG. 4, except for in frames 6 and 12, every other five channel periods are unused. If the translation process were to require more time, these channel periods would be available.

Referring to FIG. 5, there is shown the relative timing between signalling translation transactions, bus actions and the channel bits. Hereinafter is a list of transactions that occur each time a receive and transmit channel are translated. These transactions are shown in FIG. 5. The transactions are listed in the sequence in which they occur with the exception of "Out SS" and "Out TS" which occur within every channel period.

SIGNALLING TRANSLATION TRANSACTIONS

Out SS—Output signal bits and control bits from the service signal state RAM to the digital terminal interface 30 for the next receive channel to be shifted to the digital terminal interface.

Out TS—Output A/B Signal bits and control bits from the service signal state RAM to the DS1 interface 24 for the next transmitted channel to be shifted out.

1—Input and latch transmit channel local system signal bits from the digital terminal interface.

2—Read and latch transmit channel service code and A/B signal bits from RAM.

3—Read and latch for the transmit channel, eight prior machine states from RAM.

4—Read and latch receive signal bits from RAM.

5—Read and latch for the receive channel, eight prior machine states from RAM.

6—Read and latch receive channel remote system A/B signal bits from the DS1 interface 24.

7—Write the resulting prior machine states from EPROM and combinational logic to RAM for the transmit channel.

8—Write the resulting translated A/B signal bits from EPROM and combinational logic to RAM for transmit channel.

9—Write the resulting prior machine states from EPROM and combinational logic to RAM for the receive channel.

10—Write the resulting translated signal bits from EPROM and combinational logic to RAM for receive channel.

Referring to FIG. 5, note that within each channel period, the "Out SS" and "Out TS" transactions must take place to update the inputs and outputs to the digital terminal interface and DS1 interface.

The various bus actions are set forth in FIG. 5 and these actions must take place in accordance with designated bus action rules. The bus action rules were based on a possible LSI, implementation with external EPROM and RAM, using a DS1 1.544 MHZ clock to perform all data transfers. The transactions were sequenced using the bus action rules to minimize the time required to perform each transaction. The bus action rules provide that a "T" action be inserted between any read-to-write or write-to-read operation change. The "T" action is known as tristating and is an inactive bus state provided while the bus changes directions. "WR" actions require two bit time cycles, one bit time to output the address and data to RAM, and one bit time to generate a write pulse to RAM. Sequential "RR" actions can be taken in adjacent time slots without an intervening "T" action. Sequential "WR" actions can be taken in adjacent time slots without an intervening "T" action. "RRE" are equivalent to "RR" but, in the proposed implementation, are internal to the LSI During the frame bit, no transactions take place.

While the invention has been described using a TR8 specification, a DSI signalling format for the Digital Loop Carrier and an Alcatel 1218 Digital Remote Terminal, it is to be understood that the invention is uniquely adaptable for providing translations between various signalling schemes without the need for significant modification. This adaptability also allows for corrections or modifications which may be required when one machine,s signalling scheme is unknowingly changed. This adaptability is uniquely provided by the translation state machine comprising the receive and transmit latches, combinational logic, EPROM and service signal state RAM. Through the use of an EPROM and one of numerous existing combinational logic circuits, the translation requirements can be changed or added to when the invention is to be used with equipment of different manufacturers or when the existing equipment is to provide new types of telephone service. The translator is no longer rigidly adapted for translation of signalling for one specific type of telephone service or signalling used by one particular manufacturer.

What is claimed is:

1. A multi-task telephone signalling translator for use in a telephone system having first and second interconnected multi-channel facilities each using a different signal coding scheme, each of said facilities transmitting signalling to and receiving signalling from the other of said facilities on the channels of said facilities which channels are each adapted to provide a selected one of a plurality of telephone service types, said translator comprising:
   translating means disposed between said facilities and connected thereto for translating the signalling of each facility from the coding scheme of the transmitting facility to the coding scheme of the receiving facility for each selected type of telephone service provided by the channels of said facilities.

2. A multi-task telephone signalling translator as described in claim 1, wherein said translating means comprises a programmable state machine for providing the required translation for each type of telephone service provided.

3. A multi-task telephony signalling translator as described in claim 2, wherein the programmable state machine comprises:
   a combinational logic means for translating said signalling.

4. A multi-task telephony signalling translator as described in claim 3, wherein said combinational logic means comprises a plurality of combinational logic circuits programmable for translating signalling for particular types of telephone service.

5. A multi-task telephone signalling translator as described in claim 3, wherein the programmable state machine additionally comprises a programmable memory means, said memory means being responsive to signals generated by the combinational logic means for outputting control signals for changing the signalling translation response of the combinational logic means, whereby the signalling translation performed by the translator can be changed by reprogramming the memory means to accommodate changes in the types of telephone service provided and in the coding scheme of a facility.

6. A multi-task telephony signalling translator as described in claim 5, wherein the programmable memory comprises an EPROM.

7. A multi-task telephony signalling translator as described in claim 2, for use in a system wherein said first and second facilities transmit information therebetween in a plurality of time division multiplexed channels with each channel having associated signalling, said signalling translator being time shared between said channels.

8. A multi-task telephony signalling translator as described in claim 7, additionally comprising:
   random access memory means connected to said programmable state machine for storing therein data for each channel, said data including previously translated channel signalling for each of said first and second facilities and the state of the state machine at the end of the last translation for the associated channel, whereby for each channel translation process said state machine receives new signalling from each of said facilities along with stored data from said random access memory means so that said state machine may translate said signalling in accordance with the prior state of the state machine and the previously translated signalling state.

9. A multi-task telephony signalling translator as described in claim 8, wherein said translator is adapted to translate signalling for a plurality of types of telephone service that may be provided on different channels, said stored data additionally including a code for the type of telephone service provided on said channel.

10. A multi-task telephony signalling translator as described in claim 9, wherein the programmable state machine comprises a combinational logic means for translating said signalling.

11. A multi-task telephone signalling translator as described in claim 10, wherein said combinational logic means comprises a plurality of combinational logic circuits, each adapted for translating signalling for a particular type of telephone service.

12. A multi-task telephone signalling translator as described in claim 10, wherein the programmable state machine additionally comprises a programmable memory means, said memory means being responsive to signals generated by the combinational logic means for outputting control signals for changing the signalling translation response of the combinational logic means, whereby the signalling translation performed by the translator can be changed by reprogramming the memory means to accommodate changes in the types of telephone service provided and in the coding scheme of a facility.

13. A multi-task telephony signalling translator as described in claim 12, wherein the programmable memory comprises an EPROM.

14. A multi-task telephony signalling translator as described in claim 13, wherein said programmable state machine additionally comprises latch means having inputs for receiving and latching said signalling transmitted from said facilities, said latch means also receiving and latching data from said random access memory means, said latch means having an output to said combinational logic means.

15. A multi-task telephony signalling translator as described in claim 14, additionally comprising:
a bidirectional bus interconnecting said latch means input, said random access memory means and said combinational logic means; and
control means for controlling said bidirectional bus and said random access memory means.

16. A multi-task telephony signalling translator as described in claim 15, additionally comprising first and second interface means, each being disposed between one of said facilities and said programmable state machine, each of said interfaces having an external input and output for receiving and transmitting signalling from and to one of said facilities, each of said interfaces additionally having an internal input connected to said bidirectional bus for receiving signalling from said programmable state machine and an internal output for providing signalling to said latch means.

17. A method of translating telephony signalling in a telephone system having first and second interconnected facilities each using a different signal coding scheme, each of said facilities transmitting signalling to and receiving signalling from the other of said facilities in a plurality of time division multiplexed channels wherein said channels provide different types of telephone service, said method comprising the steps of:
providing said signalling to a programmable state machine for translating said signalling;
decoding a first portion of said signalling in said state machine to provide a memory address;
providing said address to a programmable memory means, said programmable memory means providing a control signal output in response to said address;
providing the control signal to said state machine;
modifying the translational response of the state machine in response to said control signal; and
providing an output containing translated signalling.

18. A method as described in claim 17, additionally comprising the steps of:
storing the translated signalling;
storing the state of the state machine; and
providing said stored information to said programmable state machine at the start of a next translation process.

19. A method as described in claim 18, additionally comprising the steps of:
storing for each channel a code indicative of the type of telephone service being provided on said channel; and
providing to said state machine said stored code at the beginning of a translation process for a channel.

20. A method as described in claim 19, additionally comprising the step of:
simultaneously translating signalling transmitted from said first and second facilities for a particular channel.

* * * * *